INVENTOR
Charles ILLOUZE
BY
ATTORNEY

United States Patent Office 3,502,485
Patented Mar. 24, 1970

3,502,485
PROCESS AND DEVICE FOR PRESERVING PLANT PRODUCTS BY MEANS OF BACTERICIDAL GAS
Charles Illouze, 4 Rue des Abbesses, Paris, France
Filed May 11, 1966, Ser. No. 550,092
Int. Cl. B65b 25/02; A23b 7/00
U.S. Cl. 99—154
11 Claims

ABSTRACT OF THE DISCLOSURE

Plants, such as fruits and vegetables are enclosed within an impervious, preferably plastic material container, in the presence of a bactericidal gas generator, such as metabisulfite which releases sulfur dioxide. Air is permitted to enter inside the container and to circulate therein to allow respiration of the plant products. The apparatus comprises the above impervious container, a bactericidal gas generator placed inside the container, the container having an opening to allow a circulation of air inside the container for a proper respiration of the plant products.

---

This invention relates to a process and a device for preserving plant products by means of bactericidal gas. More particularly, this invention is directed to the preservation of all plant products for a long and indefinite period of time.

As used herein and in the appended claims, the term plant products includes all types of fruits including citrus fruits, such as grape-fruit, oranges, mandarines and lemons; stone-fruits such as apricots, plums, peaches and cherries; seed-fruits such as grapes, tomatoes and pears. Other fruits are embodied in the above-expression such as avocadoes; mangoes and bananas; fresh vegetables such as beans, shelled or unshelled peas, carrots, peeled or unpeeled potatoes, and edible stalks such as asparagus, celery and rhubarb.

The present invention also covers cut flowers from bulbs, the tubercles and roots.

In the storage and in the transportation abroad of plant products, many difficulties have to be overcome. The action of mildew and fungi such as penecillium, phytophtora and bacillus putrificus may do considerable damage to plant products during their storage in cold rooms even at a maximum degree of refrigeration for each category of fruits, vegetables or flowers. A deteriorating action may also occur during the transportation of these plant products at a relatively warm temperature.

The main constituents of plant products consist mostly of diastases, glucosides, lipides, vitamines, soluble sugar, acids and salts. The plant products also contain a relative amount of water and other substances. When they are stored in cold rooms, there is a decrease of their water content, which is determinental to the constituents referred to above and consequently to the quality of the plant products.

The transformations and deteriorations occuring in the plant products are mainly due to the transpiration, the respiration and the fermentation of these plant products. It is to be noted that they always stay alive. A high water and pigment content is an indication of freshness and gives a nice appearance to the plant products.

The respiratory phenomena are in the nature of a combustion. The respiration, the transpiration and the fermentation are more active when the ambient temperature is slightly elevated.

The respiration is related to the normal life of the organs of the plant products. If respiration is prevented by limiting the availability of oxygen, the life of the plant products is made difficult. Respiration is dependent on the variations of the respiratory quotient of each fruit, vegetable or flower.

Fermentation per se results in the production of products such as ethyl alcohol and acetaldehyde to produce particular taste and smell in the plant products. The cells die and are then fastly destroyed by the action of bacterias, mildews and other micro-organisms. During the storage of these plant products in cold rooms, the respiratory phenomena are limited to a strict minimum. However, cold temperature does not prevent the micro-organisms from developing and after some time, they invade the plant products and render them unfit for consumption.

It is therefore an object of the present invention to provide conditions wherein these plant products could be stored for an extended period of time under the best possible conditions.

It is another object of the present invention to provide conditions wherein these plant products may be shipped abroad without being substantially deteriorated.

It is yet another object of the present invention to overcome the disadvantages inherent to the manipulation of plant products.

These and other objects of the present invention are accomplished by enclosing the plant products in a container in the presence of a bactericidal gas generator while the container is maintained under controlled aeration.

In accordance with a specific aspect of the invention the plant products are enclosed in bags or wrapper made of plastic materials preferably polyethylene, those known under the trademarks Pliofilm and cellophane and other plastic materials. The plant products so wrapped are disposed in crates, wooden cases or cartons for an easier storage of the plant products in cold rooms. When these plant products are in cold rooms, means are provided to circulate within these wrappers or plastic bags a chemical gas, preferably a sulfurous gas around these plant products.

In these bags or wrappers are provided openings which could vary in size and according to the plant products. The remaining portions of these bags or wrappers are made impervious. The opening is used to assure a proper respiration which will be reduced to a bare mnimum. The plant products must have a supply of oxygen and they throw away carbon dioxide. The fumigation within these bags or wrappers enclosing these plant products may be induced by any solid or liquid chemical substance which is enclosed separately either in a small bag made of plastic material or in any other wrapping allowing the evaporation of a chemical gas.

This chemical substance may be a metabisulfite, preferably of an alkali of alkali-earth metal. The most sutiable compound is $K_2S_2O_5$ which will slowly and continuously release sulfur dioxide. This substance may be associated with a compound such as alum to regulate the release of sulfur dioxide. However, any other compound which will provide a permanent fumigation may be used. The above potassium compound was given as an example only and is not intended to be limitative. The fumigating material constantly and permanently liberate a vapor which surrounds the plant products to prevent the fermentations of mildews during the storage and during the transportation of the plant products.

After some time has elapsed there is no difficulty in introducing another sachet of the chemical substance through the above-mentioned opening so that the sulfur dioxide gas can be renewed.

The quantity of $K_2S_2O_5$ which is used may vary within wide limits but it is preferably within the range of 0.001% to 5% of the weight of the plant products.

It is obvious that the plant products must be put in cold rooms in a controlled atmosphere. The composition of the atmosphere being given as illustrative only and not intended to be limitative varies according to species, between 0.85 and 0.90. A high degree of humidity will will be necessary to compensate for the loss of water in all these fruits, vegetables, or flowers.

Another advantage of the present invention resides in the fact that the degree of humidity is as high as possible. This is accomplished by wrapping the stalks of the plant products with a layer of an absorbing material such as cellulose, cotton, cotton-waste impregnated with distilled water, said layer having a thickness varying according to the plant products and according to the size of the stalks. This particularly apples to cut flowers, to bunches of grapes having vine-shoots, to the trunks of banana clusters or bunches of bananas or other plant products having stalks which may vary according to length. By this method, there will be an additional supply of liquid food for all the above plant products.

The combined humidity inside and outside the wrappings are essential to the metabolism of such plant products in order to store them under the best possible conditions for an indefinite period so that they are always fresh.

The action of micro-organisms on fruits and vegetables, would appear to comprise in the initial stage:
(1) A fixation at the surface of the fruit;
(2) A penetration in depth to the interior of the fruit.

It has been observed that by the action of the fumigating agent i.e. conversion of all the chemical substances which are either volatizable or capable of producing gases by the decomposition, oxidation, sublimation, reduction or any other physical or chemical action converting the solid or liquid chemical product to gas or vapors, gives a depth penetration property which is therefore much more effective on the micro-organisms which attack the fruit.

It has also been found that the retarding agent enables the evolution of these gases or vapors to be restrained so that they have contact for a longer period and hence give a much more effective action against these microorganisms.

It has further been found that with the fumigating agent, such as the metabisulfite, preferably of an alkali or alkaline-earth metal in combination with a retarding agent, it is possible to maintain a delayed evolution of sulfur dioxide. This retarding agent is preferably alum as stated above. A curative action can be obtained by the addition of certain essential elements already present in each of the fruits or vegetables and which are compatible with the plant products and the forms in which they are to be used, and this effect is due to the supplementary action of these essential elements. Such essential elements may include lipides used alone or in combination with alkali or alkaline-earth metal. Microorganisms attack fruits only if there is a deficiency of some of the elements of the fruits.

We have found that all the so-called "red" fruits or vegetables such as the raspberries, strawberries, cherries, red-currant, tomatoes and red beets have a very high sorbates content.

The following acids may be used as auixiliary agent in combination with the fumigating composition:

Sorbic acid         Citric acid
Benzoic acid        Pectic acid
Quinic acid         Tannic acid
Malic acid          Tartaric acid
Stearic acid        Para-aminobenzoic acid and their derivatives.

The above acids could be used alone or in various combinations, such as in the form of salts of alkali or alkali-earth metals, preferably sodium, potassium or calcium salts.

The metabisulfites may be used in quantity varying between 0.001% to 5% by weight of the plant products. They could be used in association or in combination with approximately 0.001% of a retarding agent such as alum.

The amounts of the said acids may range between 0.001 to 5% of the weight of the plant products.

The various plant products such as fruits and vegetables to be treated in accordance with the process of the invention can be used either whole or sliced, peeled or unpeeled, raw or cooked, as for example in the case sliced or unsliced cooked red beets.

In all the cases mentioned above it has been found that the storage period is considerably improved, varying from many days to many months.

It has been found that the strawberries can be kept for approximately fifteen days. Sliced tomatoes can be stored for a period of approximately three weeks; cut beets, for approximately one month; apples and pears for many months. The muscat grapes can be stored for a period extending to approximately four mouths. In this case, the grapes should preferably be placed in a cold room for the treatment period.

It is possible to replace the small bag made of a plastic material such as which is a registered trademark, by a ventilated material such as gauze or the like. Any other packing material which would enable the gases and vapors to escape.

The process according to the present invention is of considerable importance in the storage of fruits and vegetables for marketing and distribution at every stage.

It is particularly important for the transportation of fruits and vegetables in the ship holds. In this particular case, the bactericidal gas generators are conveniently set up as in the case of large store rooms. The generators comprise a composition consisting of at least a metabisulfite, a retarding agent and one of the auxiliary compounds described above. They are set at different locations according to the following equation:

$$V = \frac{\text{weight of the composition} \times 60}{100}$$

The process according to the present invention may also be used in cereal silos, inter alia for leguminous vegetables such as wheat, corn, oat, for hay silos and for folder provided a pH condition which varies between 3.5 and 4 is maintained. By using admixtures of citric and tartaric acid, sugar beets can be preserved in silos while maintaining a pH between 3.8 and 4.2 for a period of four to five months.

It may be pointed out that auxiliary fumigating agents may be used in combination with the above compositions such as methyl bromide, ethylene oxide, amyl acetate, propylene oxide, ethylene, dibromide, ethylene chlorobromide, acrylonitrile, ethylene dichloride, methyl dichloride, methyl formiate, ethyl formiate, alkyl halides and the derivatives or homologues thereof.

The treatments according to the process of this invention may be carried out by using a solution of the various compositions defined hereinabove. The treatment may be carried out by dipping and then drying the fruits or vegetables, by vaporizing the solution on the fruits or vegetables or by directly contacting surface of the fruits or vegetables with the compositions according to this invention.

By these treatments, it is possible to obtain a deep penetration of the sulfur-containing gases released by the metabisulfites.

In the drawings which illustrate the invention,

Figure 1:
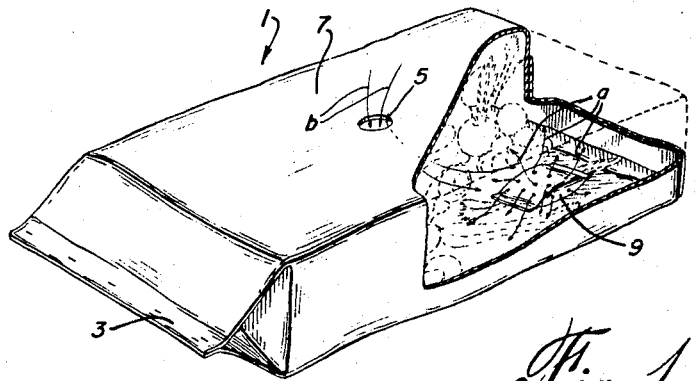
FIGURE 1 is a perspective view of a container for preserving plant products, which has been partly cut out to show the interior thereof.
Figure 2:
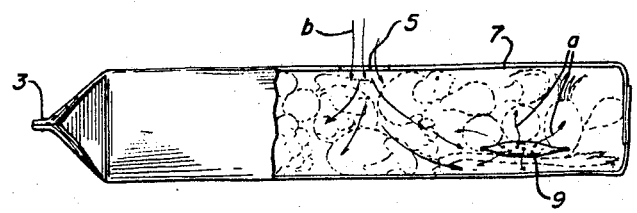
FIGURE 2 is a side elevation view of the container of FIGURE 1, also partly cut out to show the interior.

Referring to the drawings (FIGURES 1 and 2), the device according to the invention will be seen to comprise an impervious plastic bag 1 having a sealed closure 3 and formed with a small circular opening 5 in the upper face 7 thereof. Inside the impervious plastic bag 1, there is provided a small bag 9 made of perforated plastic material and filled with an alkali metabisulfite. The bag 1 is filled with the fruits and/or vegetables shown in dotted lines in the drawings.

Figure 3:
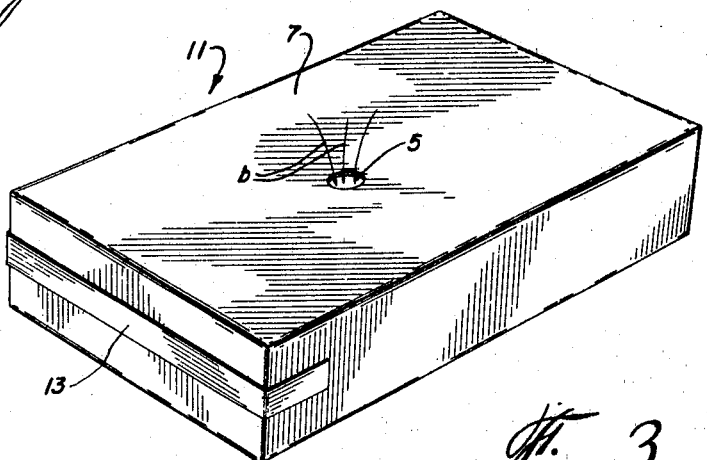
FIGURE 3 is a perspective view of another container.

FIGURE 3 represents an alternative construction. The container is a rectangular box 11 made of impervious plastic closed by a closing strip 13 and serves the same purpose as the plastic bag 1, since otherwise it is similar.

It will be seen that the alkali metabisulfite will release sulfur dioxide as indicated by the arrows *a* and the fruits and vegetables will be aerated by the entry of air through the opening 5 in the direction of the arrows *b*.

The following examples are given as illustrating and are not intended to be limiting.

EXAMPLE 1

Approximately 5 kilograms of grape clusters provided with vine-shoot portions, each of the cluster being covered by a cotton pad impregnated with water, are inserted into a bag of a plastic material. Separately, in a corner of a crate there is disposed a small bag made of a preforated plastic material containing 0.005% sodium or potassium metabisulfite and 0.001% of alum which is being used as a retarding agent. This impervious wrapping comprises an opening on the upper part thereof for a proper respiration of the grapes with the outside. The wrapper is well covered with the plastic bag crate and is sent for storage.

EXAMPLE 2

A banana cluster is inserted into a plastic bag. The stem of this cluster is surrounded by a layer of cotton impregnated with distilled water. Separately, there is provided a small bag of perforated plastic material, containing a metabisulfite and 0.001% of alum. This plastic bag is completely impervious except for an opening provided at the top portion thereof to maintain a proper respiration of the bananas with the outside. The imperviousness of this plastic material may be made according to any known sealing method.

EXAMPLE 3

20 kilograms of pears are put into a crate. At the four corners of this crate, there is disposed a small bag comprising 0.008 part of potassium metabisulfite and 0.002 part of alum. The crate is covered with a bag of plastic material which has an opening at the top portion thereof to permit a proper respiration of these fruits with the outside.

EXAMPLE 4

One kilogram of shelled peas are placed in a carton through. Separately, beside this package, a small bag of perforated plastic material is provided for fumigation of sulfur dioxide by means of 0.002 part of metabisulfite and 0.001 of alum. The carton through and the small bag are wrapped in a plastic bag having a small hole to permit respiration with the outside.

EXAMPLE 5

A bundle of flowers is deposited in a wrapper of plastic material. The peduncles are covered with an absorbent material impregnated with water. At the bottom of the bag, a small bag of perforated material containing 0.001% of potassium or soidum metabisulfite is provided to release a sulfur containing gas. A small opening is made at the upper part of the bag for a proper respiration of these flowers with the outside.

EXAMPLE 6

Sorbid acid or any derivatives thereof may be added to each of the "red" fruits in combination with the fumigating composition comprising potassium metabisulfite (fumigating agent) and alum (retarding agent) to obtain the combination sulfur dioxide sorbite in the form of fumigating vapors. These vapors will have a curative or preventive action on these fruits and vegetables liable to be attacked by micro-organisms.

EXAMPLE 7

For case of oranges, lemons, mandarines, red-currant and bilberries, fumigating agent is used in combination with citric acid or any derivatives thereof and there is obtained the combination sulfur dioxide-citrate, which has a curative or preventive action on these fruits or vegetables when they are attacked by micro-organisms.

EXAMPLE 8

In the case of almonds, walnuts, hazelnuts, benzoins, fumigating agent is used in combination with benzoic acid or any derivatives thereof and there is obtained the combination sulfur dioxide-benzoate having a curative or preventive effect on these fruits or vegetables when they are attacked by micro-organisms.

EXAMPLE 9

In the case of apples, pears, red-currant, bananas, carrots, turnips, a fumigating agent is used in combination with pectic acid or any derivatives thereof and there is obtained the combination sulfur dioxide-pectate-pectine having a curative or preventive action on these fruits and vegetables when they are attacked by micro-organisms.

EXAMPLE 10

In the case of quinquina, coffee, acorns and chestnuts, a fumigating agent is used in combination with quinic acid or any deriatives thereof and there is obtained the combination sulfur dioxide-quinate having a curative or preventive action on these fruits or vegetables when they are attacked by micro-organisms.

EXAMPLE 11

In the case of jujubes, plums, tea, rhubarbs, willow shells, pine shells, absinths, horse-chestnuts and arnica, a fumigating agent is used in combination with tannic acid or any derivatives thereof and there is obtained the combination sulfur dioxide-tannate, having a curative or preventive action on these fruits or vegetables.

EXAMPLE 12

In the case of peaches, apricots, fumigating agent is used in combination with maleic acid or any deriatives thereof and there is obtained the combination sulfur dioxide-maleate having a curative or preventive action on these fruits or vegetables when they are attacked by micro-organisms.

EXAMPLE 13

In the case of grapes and bay, a fumigating agent is used in combination with tartaric acid or any derivatives thereof and there is obtained the combination sulfur dioxide-tartarate having a curative or preventive action on these fruits or vegetables when they are attacked by micro-organisms.

EXAMPLE 14

In the case of wheat, barley, oat, corn and spurred rye, a fumigating agent is used in association with paramino-benzoic acid or any deriatives thereof and there is obtained the combination sulfur dioxide-para-aminobenzoate having a curative or preventive action on these fruits or vegetables.

EXAMPLE 15

In the case of avocados, a fumigating agent is used in association or in combination with a stearic acid or any derivatives thereof and there is obtained the combination sulfur dioxide-stearate having a curative or preventive action on these fruits.

It is possible to make up solution comprising 95% by weight of water and 5% by weight of the fruits of the compounds, sorbets, citrates, benzoates, and so forth and to use these solutions to dip the fruits and vegetables and to dry them or to vaporize the fruits directly with these solutions.

According to a modification given by way of illustration and not intended to be limiting, it is possible to use light papers or cartons to wrap up each fruit. These papers or cartons are dipped in the above solutions, they are dried and the fruits are directly wrapped up as they are. This process could be applied to apples, pears, plums, lemons and oranges in order to have a direct action of the alkali or alkali-earth metals on the surface of these fruits and, simultaneously, deep into the body these fruits to fight micro-organisms.

It is obvious that the percentages of the salts as given above be varied: they could be either increased or decreased.

In the case of strawberry or raspberries or any other delicate fruits, small troughs containing 100, 200, 500 grams or one kilogram may be used. Light papers or sheets of papers are interspaced between the fruits and are used for wrapping. Vaporization can thereafter be carried out by using the above solutions. The wrappings are afterwards dried. According to other modifications of this invention, there may be added any solvents or chemical products having a bactericidal effect on the microorganisms.

I claim:
1. A device for preserving plant products comprising in combination
   (a) a plastic container enclosing said products;
   (b) at least one closed, small container inside said plastic container;
   (c) said small container being made of a material capable of permitting gas to pass through and containing therein a material in sufficient quantity to release a preservative gas in order to preserve said plant products; and
   (d) at least one small opening in said plastic container to maintain a proper respiration of said plant products.

2. In a device for preserving plant products, the combination which comprises:
   (a) an impervious plastic bag enclosing said plant products;
   (b) at least one small bag inside said impervious plastic bag;
   (c) said small bag being made of a perforated plastic material and containing therein an alkaline-earth metal metabisulfite to release sulfur dioxide therefrom in amount sufficient to preserve the plant products; and
   (d) a small opening in said impervious plastic bag to maintain a proper respiration of said plant products.

3. In a device as defined in claim 2, wherein sodium or potassium metabisufite are contained within said small bag.

4. In a device as claimed in claim 3, wherein said small bag also contains a retarding agent to control the release of sulfur dioxide.

5. In a device as defined in claim 4, wherein said retarding agent is alum.

6. In a device for preserving plant products as defined in claim 5, which contains about 0.001% by weight of said plant products of alum.

7. In a device according to claim 5, wherein said small bag further contains an organic acid already present in said plant product.

8. In a device according to claim 7, wherein said acid is selected from the group consisting of sorbic, citric, benzoic, pectic, quinic, tannic, malic, tartaric, para-aminobenzoic and stearic acids and their derivatives in an amount ranging from 0.001% to 5% by weight of said plant products.

9. In a device according to claim 7, wherein said small bag further comprises a fumigating agent.

10. In a device for preserving plant products as defined in claim 2, which contains from about 0.001% to about 5% by weight of said plant products of the sulfur dioxide releasing compound.

11. In a device according to claim 2, wherein said small bag comprises an auxiliary bactericidal agent.

References Cited
UNITED STATES PATENTS

| | | | |
|---|---|---|---|
| 233,217 | 10/1880 | Derby | 99—227 |
| 473,631 | 4/1892 | Loepere | 21—109 |
| 825,378 | 7/1906 | Caldwell et al. | 99—153 |
| 1,036,243 | 8/1912 | Hooker | 99—153 |
| 1,087,798 | 2/1914 | Marcet | 99—156 |
| 1,219,096 | 3/1917 | Geeslin | 21—109 |

MAURICE W. GREENSTEIN, Primary Examiner

J. M. HUNTER, Assistant Examiner

U.S. Cl. X.R.

99—171, 227; 21—108